US010406996B2

(12) United States Patent
Ono et al.

(10) Patent No.: US 10,406,996 B2
(45) Date of Patent: Sep. 10, 2019

(54) LUGGAGE SIDE TRIM AND MOUNTING STRUCTURE OF MOUNTING THE LUGGAGE SIDE TRIM

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Teruki Ono, Aichi-ken (JP); Haruko Sato, Aichi-ken (JP)

(73) Assignees: TOYOTA BOSHOKU KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 142 days.

(21) Appl. No.: 15/824,202

(22) Filed: Nov. 28, 2017

(65) Prior Publication Data
US 2018/0148004 A1    May 31, 2018

(30) Foreign Application Priority Data
Nov. 30, 2016    (JP) .................................. 2016-232021

(51) Int. Cl.
*B60R 13/02*    (2006.01)
(52) U.S. Cl.
CPC ...... *B60R 13/0206* (2013.01); *B60R 13/0268* (2013.01)
(58) Field of Classification Search
CPC ...................... B60R 13/0206; B60R 13/0268
USPC ............................................. 296/146.7, 191
See application file for complete search history.

(56) References Cited

U.S. PATENT DOCUMENTS

| 3,525,687 A * | 8/1970 | Tino ..................... E05D 11/1007 16/344 |
| 4,851,742 A * | 7/1989 | Chapman ................ E05B 81/22 318/286 |
| 5,235,725 A * | 8/1993 | Rees ...................... E05F 1/1207 16/298 |
| 6,181,094 B1 * | 1/2001 | Menke .................. E05F 1/1207 318/434 |

(Continued)

FOREIGN PATENT DOCUMENTS

| JP | H10-287185 | 10/1998 |
| JP | 2003-237472 | 8/2003 |

(Continued)

*Primary Examiner* — Jason S Morrow
*Assistant Examiner* — E Turner Hicks
(74) *Attorney, Agent, or Firm* — Greenblum & Bernstein, P.L.C.

(57) ABSTRACT

A luggage side trim includes a body portion having an upper edge portion extending in a vehicular front-rear direction, a wall portion extending in a vehicular width direction from a part of the upper edge portion, the wall portion having an insertion hole through which a damper is to be inserted, and a slit that is communicated with the insertion hole and extends upward and toward a vehicular exterior side from the insertion hole and has a damper insertion opening being open toward the vehicular exterior side, the damper insertion opening receiving the damper that is to be guided along the slit toward the insertion hole when the luggage side trim is mounted on the vehicular panel. When the luggage side trim is mounted on the vehicular panel, an upper edge of the upper edge portion is above the damper.

11 Claims, 9 Drawing Sheets

(56) References Cited

U.S. PATENT DOCUMENTS

| | | | | |
|---|---|---|---|---|
| 6,401,392 | B1* | 6/2002 | Yuge | E05F 15/619 |
| | | | | 49/340 |
| 6,637,797 | B2* | 10/2003 | Baik | E05F 1/1091 |
| | | | | 296/76 |
| 7,147,266 | B2* | 12/2006 | Huntsman | E05C 17/042 |
| | | | | 296/146.1 |
| 8,613,478 | B2* | 12/2013 | Krajenke | B60R 13/011 |
| | | | | 16/223 |
| 9,476,237 | B2* | 10/2016 | Sato | E05F 1/1033 |
| 2002/0070579 | A1* | 6/2002 | Nakagome | B62D 25/12 |
| | | | | 296/76 |
| 2010/0275518 | A1* | 11/2010 | Nakazato | E05D 5/062 |
| | | | | 49/386 |

FOREIGN PATENT DOCUMENTS

| | | |
|---|---|---|
| JP | 2013-067210 | 4/2013 |
| JP | 2015-024744 | 2/2015 |

* cited by examiner

LUGGAGE SIDE TRIM AND MOUNTING STRUCTURE OF MOUNTING THE LUGGAGE SIDE TRIM

CROSS REFERENCE TO RELATED APPLICATION

This application claims priority from Japanese Patent Application No. 2016-232021 filed on Nov. 30, 2016. The entire contents of the priority application are incorporated herein by reference.

TECHNICAL FIELD

The present disclosure relates to a luggage side trim and a mounting structure of mounting the luggage side trim.

BACKGROUND

A mounting structure of mounting the luggage side trim has been known and a vehicle including such a mounting structure includes a damper type trunk lid (a luggage door) closing/opening mechanism. The luggage door is supported on a vehicular body via a pair of hinge arms (U-arms). A side trim (a luggage side trim) that forms a part of a side wall of a trunk room (a luggage room) is mounted on a vehicular body panel (a vehicular panel) to cover the U-arm and the dumper supporting the U-arm.

However, in the above mounting structure, the U-arms and the dampers are covered with the side trims such that the luggage room has improved appearance, however, a luggage capacity of the luggage room is reduced.

SUMMARY

The present technology has been made in view of the aforementioned circumstances. An objective of the present technology is to provide a luggage side trim and a mounting structure of mounting the luggage side trim that provide a large side wall area and a large capacity in a luggage room with a simple structure.

To solve the above problem, a luggage side trim that is to be a part of a side wall of a luggage room and to be mounted on a vehicular panel includes a body portion having a vehicular exterior surface facing the vehicular panel and an upper edge portion extending in a vehicular front-rear direction, and a wall portion extending in a vehicular width direction from a part of the upper edge portion. The wall portion has an insertion hole through which a damper is to be inserted, the damper extending in a vehicular front-rear direction and being connected to a U-arm that is connected to a vehicular luggage door closing the luggage room. The wall portion further has a slit that is communicated with the insertion hole and extends upward and toward a vehicular exterior side from the insertion hole and has a damper insertion opening being open toward the vehicular exterior side, and the damper insertion opening receives the damper that is to be guided along the slit toward the insertion hole when the luggage side trim is mounted on the vehicular panel. When the luggage side trim is mounted on the vehicular panel, an upper edge of the upper edge portion is above the damper.

DETAILED DESCRIPTION OF THE PREFERRED EMBODIMENT

To increase the luggage capacity of the luggage room according to a user's desire, the luggage side trim may be mounted on the vehicular panel without covering the U-arm and the damper. However, in such a structure, if the luggage side trim is moved substantially horizontally while standing opposite the vehicular panel toward a luggage room exterior side from a luggage room interior side to be mounted on the vehicular panel, the luggage side trim may be hit on the U-arm or the dumper. This hinders mounting of the luggage side trim.

The upper edge portion of the luggage side trim may be put in a space from a lower side with respect to the U-arm and the dumper and moved upward and toward the luggage room exterior side. Thus, the luggage side trim may be mounted on the vehicular panel. However, the dumper connected to the U-arm that supports the luggage door extends in the vehicular front-rear direction and the mounting of the luggage side trim is not smoothly performed due to the damper.

The luggage side trim may be formed such that portions thereof corresponding to the U-arm and the damper are not hit on the U-arm and the damper. For example, the portions of the luggage side trim may be cut away. In such a structure, the mounting of the luggage side trim on the vehicular panel is smoothly performed. However, an area of the luggage side trim is necessarily reduced and a part of the vehicular panel is uncovered and the appearance of the luggage room is deteriorated. Further, a space between the luggage side trim and the vehicular panel is open and luggage may drop in the space.

If the area of the luggage side trim is reduced, the noise insulation properties and vibration absorbing properties may be deteriorated. It is desirable to keep a large area of the luggage side trim to cover a whole side wall of the luggage room and absorb external noise and vibration. It is demanded to provide a luggage side trim having a large area and being able to be mounted on the vehicular panel smoothly.

Figure 1:
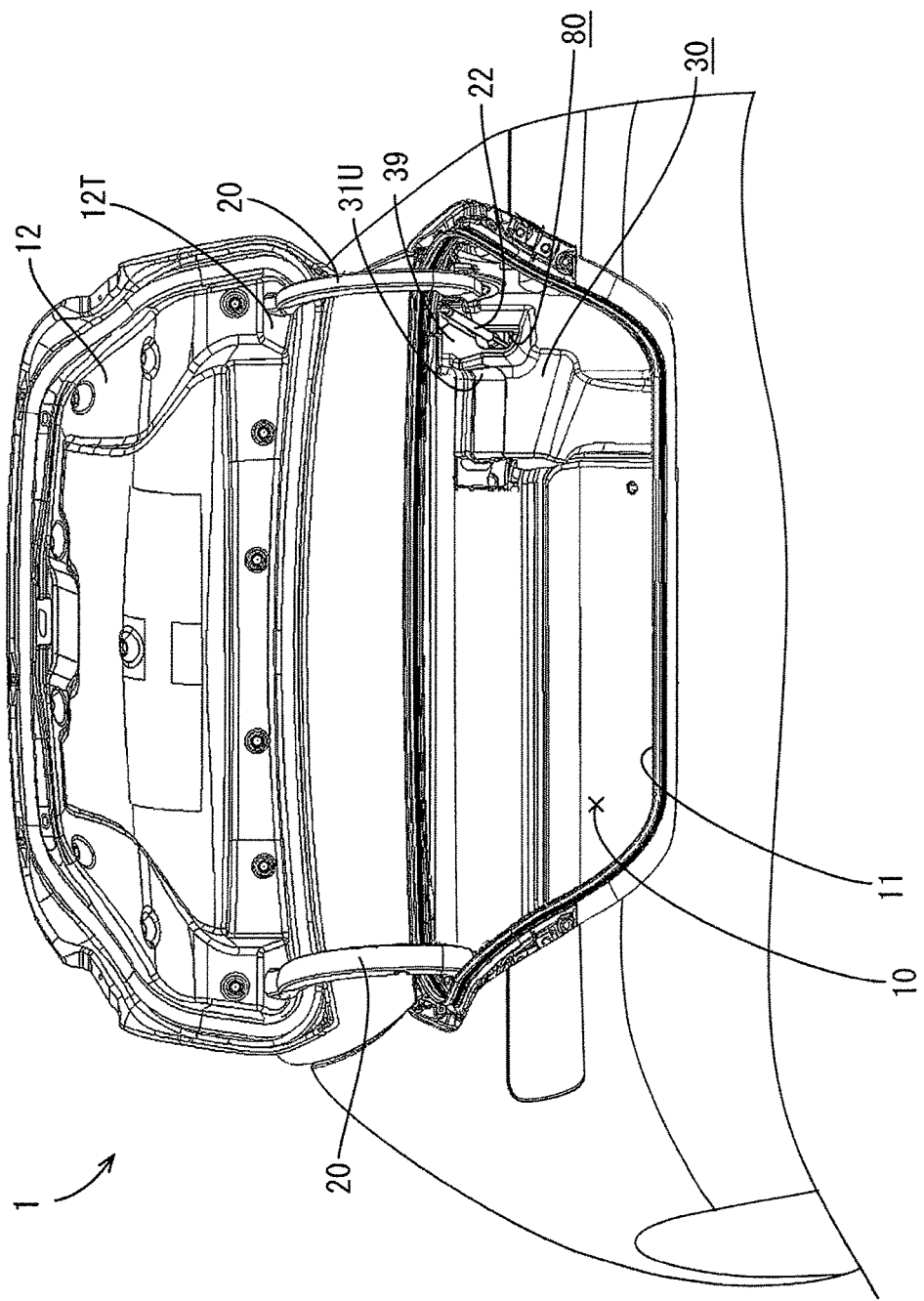
FIG. 1 is a perspective view illustrating a luggage room including a luggage side trim and amounting structure of mounting the luggage side trim according to an embodiment seen from a left and vehicular rear side.
Figure 4:
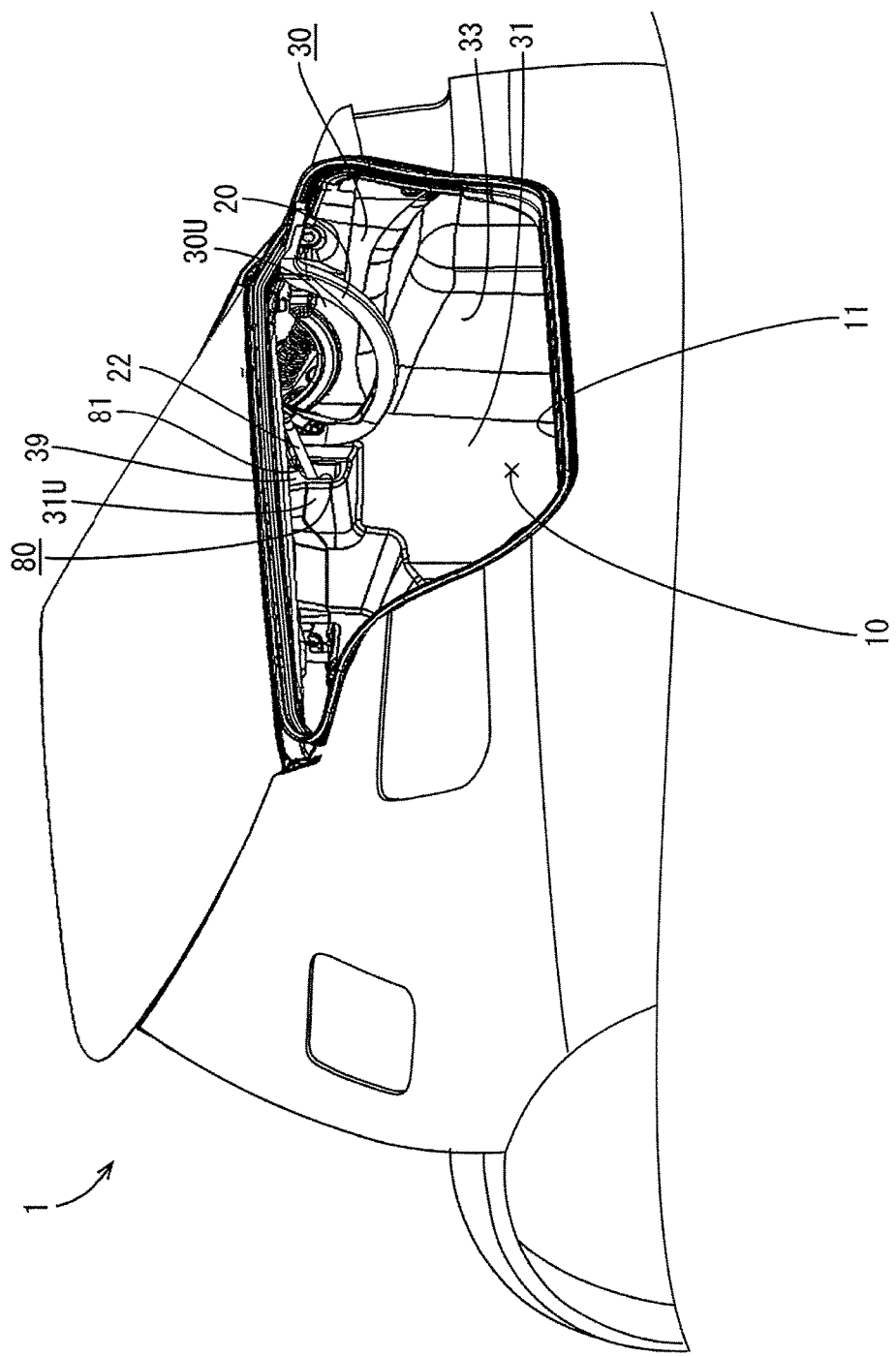
FIG. 4 is a perspective view illustrating an inside of the luggage room when a luggage door is closed.
Figure 5:
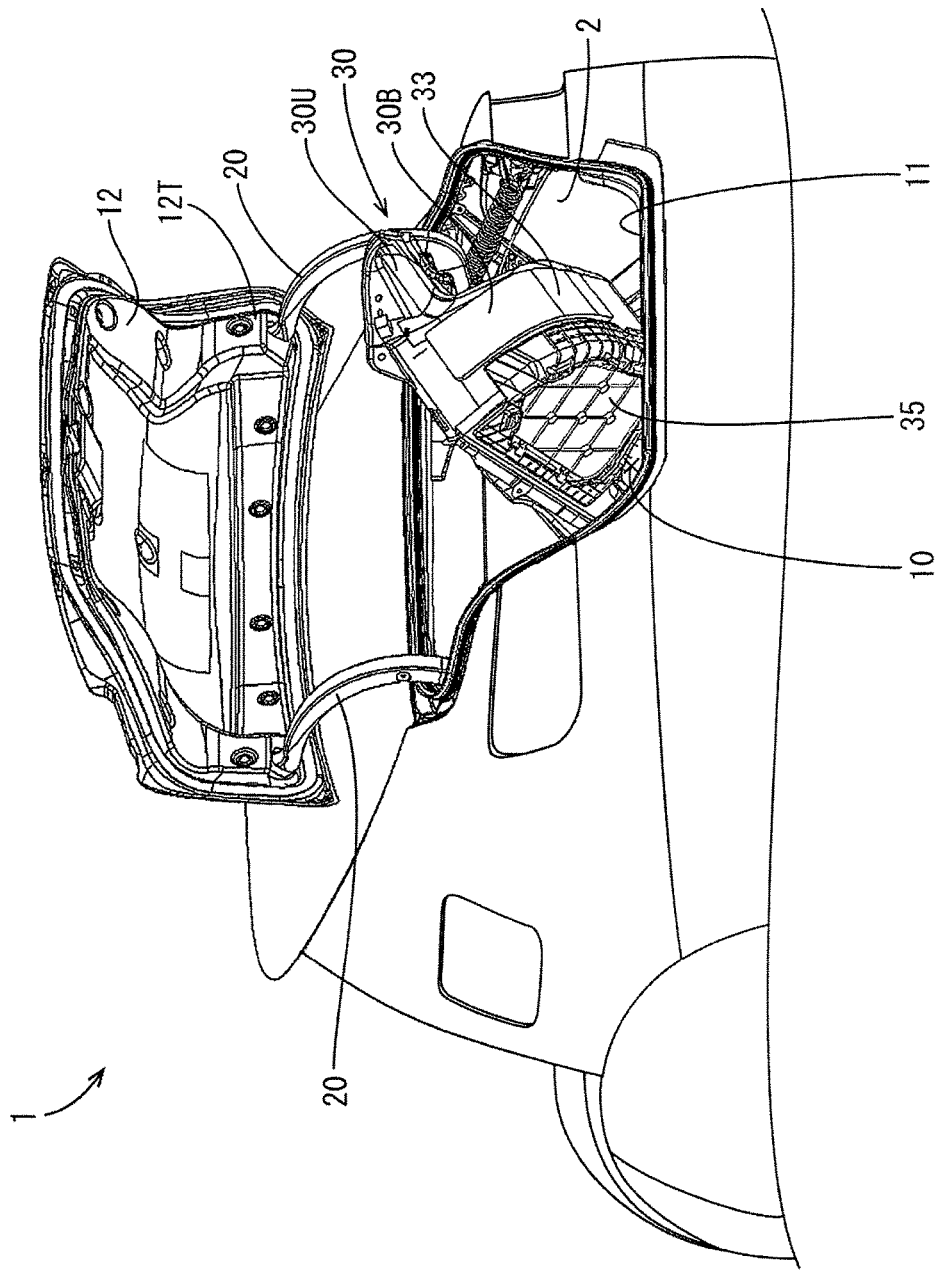
FIG. 5 is a perspective view illustrating a luggage room into which a luggage side trim is inserted.
Figure 6:
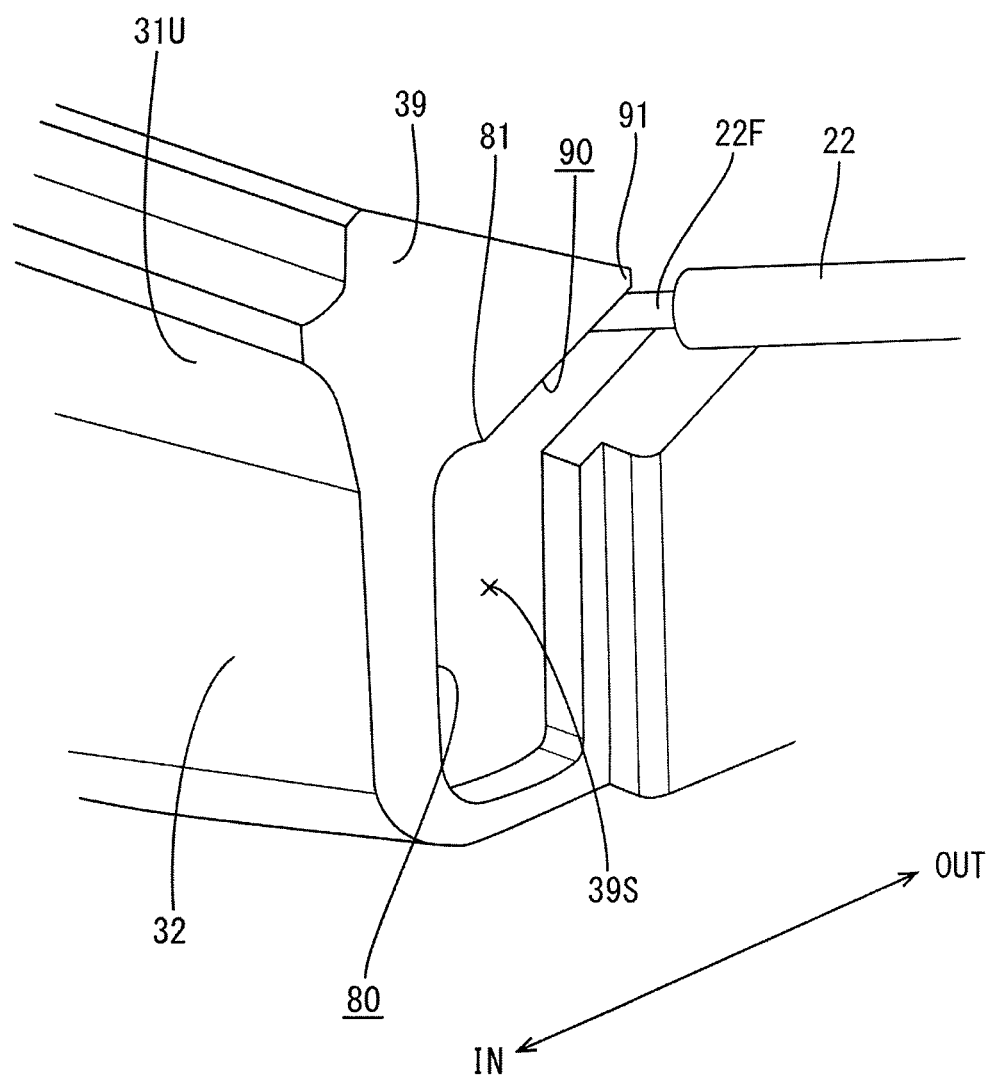
FIG. 6 is a perspective view illustrating a part of the luggage side trim in FIG. 5 near an insertion through hole.
Figure 8:
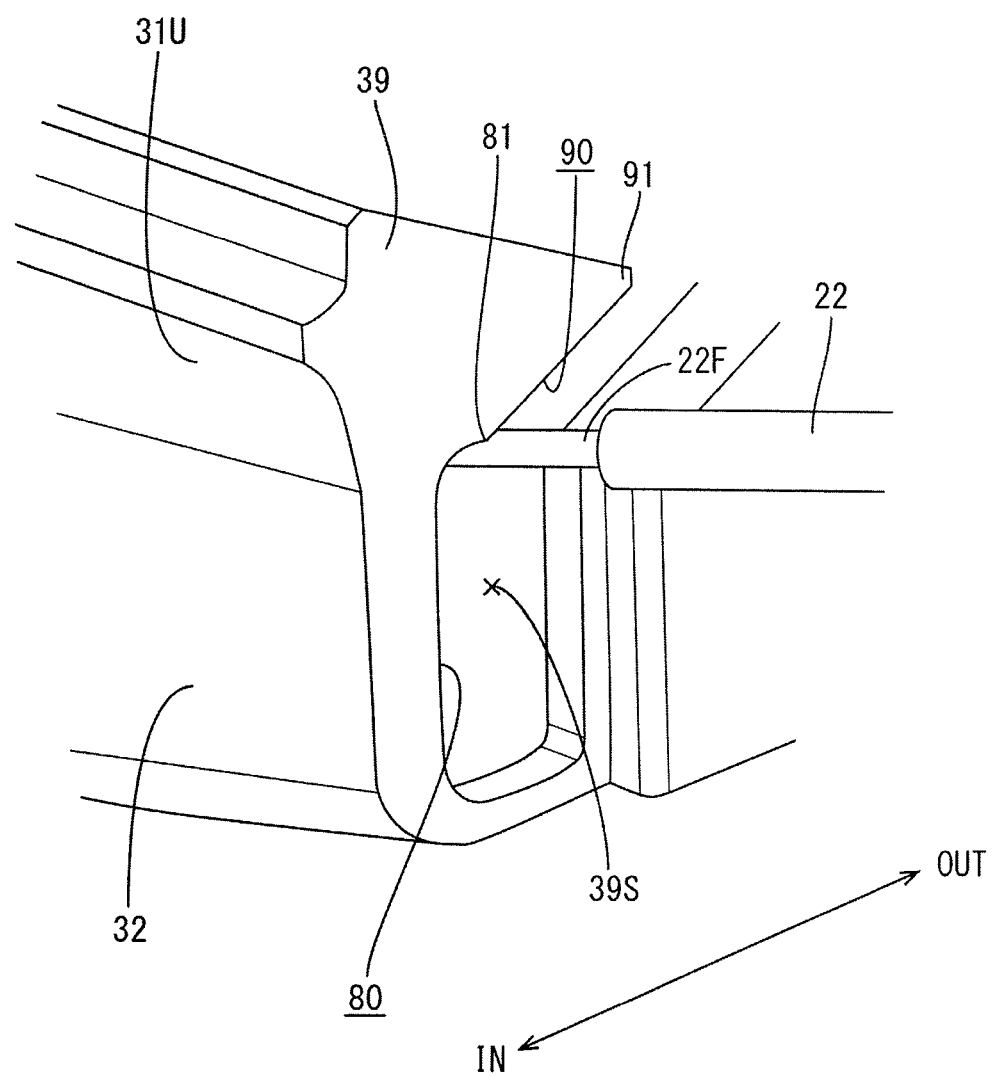
FIG. 8 is a perspective view illustrating a part of the luggage side trim in FIG. 7 near the insertion through hole.
Figure 9:
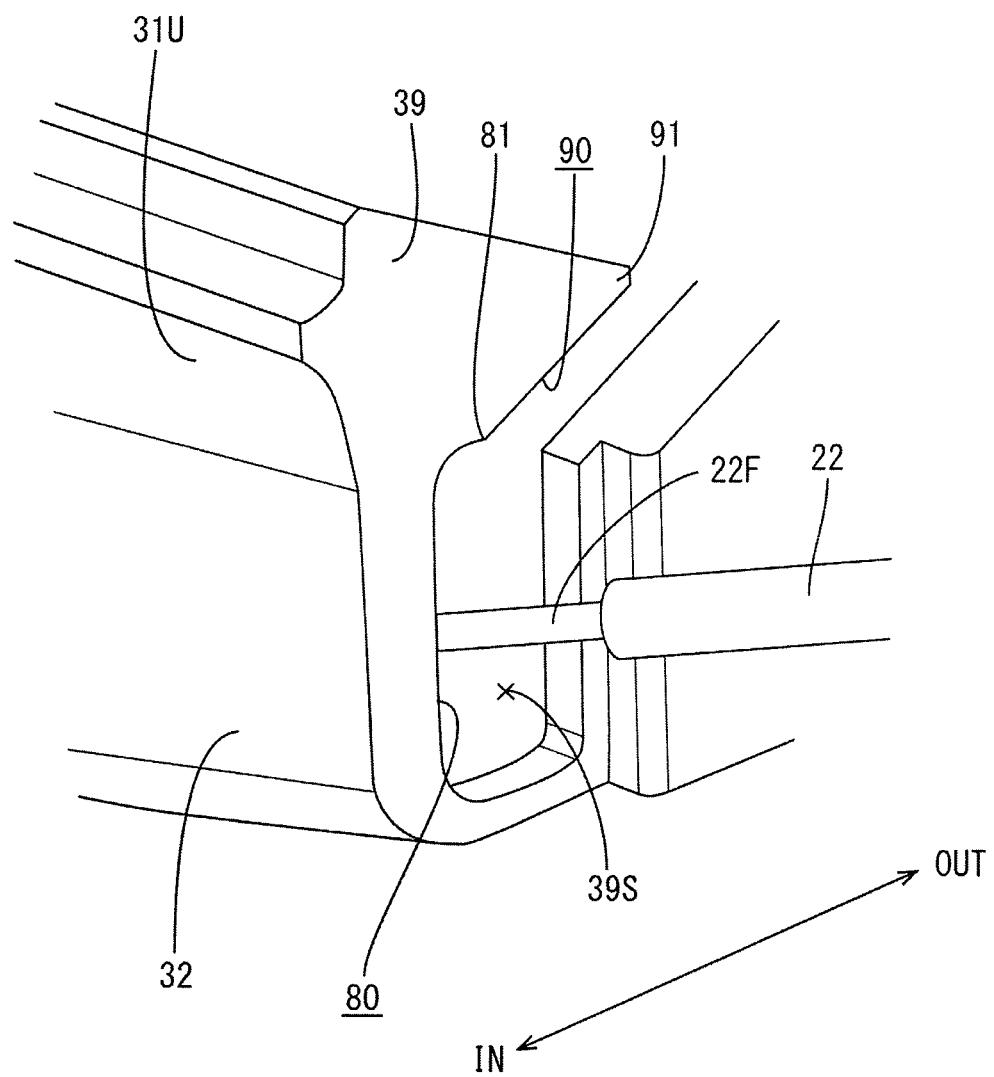
FIG. 9 is a perspective view illustrating a part of the luggage side trim in FIG. 3 near the insertion through hole.

A luggage side trim and a mounting structure of mounting the luggage side trim according to one embodiment of the present technology will be described with reference to FIGS. 1 to 9. In FIG. 1, a rear side on a sheet is a vehicular front side and a front side on the sheet is a vehicular rear side. In FIGS. 2 to 6 and 7, a left upper side on the sheets is the vehicular front side and a right lower side on the sheets is the vehicular rear side. In FIGS. 6, 8 and 9, "IN" refers to a luggage room interior side (a vehicular interior side) and "OUT" refers to a luggage room exterior side (a vehicular exterior side).

As illustrated in FIG. 1, a vehicle 1 includes a luggage room 10 at a vehicular rear side and the luggage room 10 includes a vehicular rear side opening 11 that is open toward the vehicular rear side. The vehicle 1 further includes a luggage door 12 that closes the vehicular rear side opening 11, and the luggage room 10 is accessible through the vehicular rear side opening 11 when the luggage door 12 is open.

Figure 3:
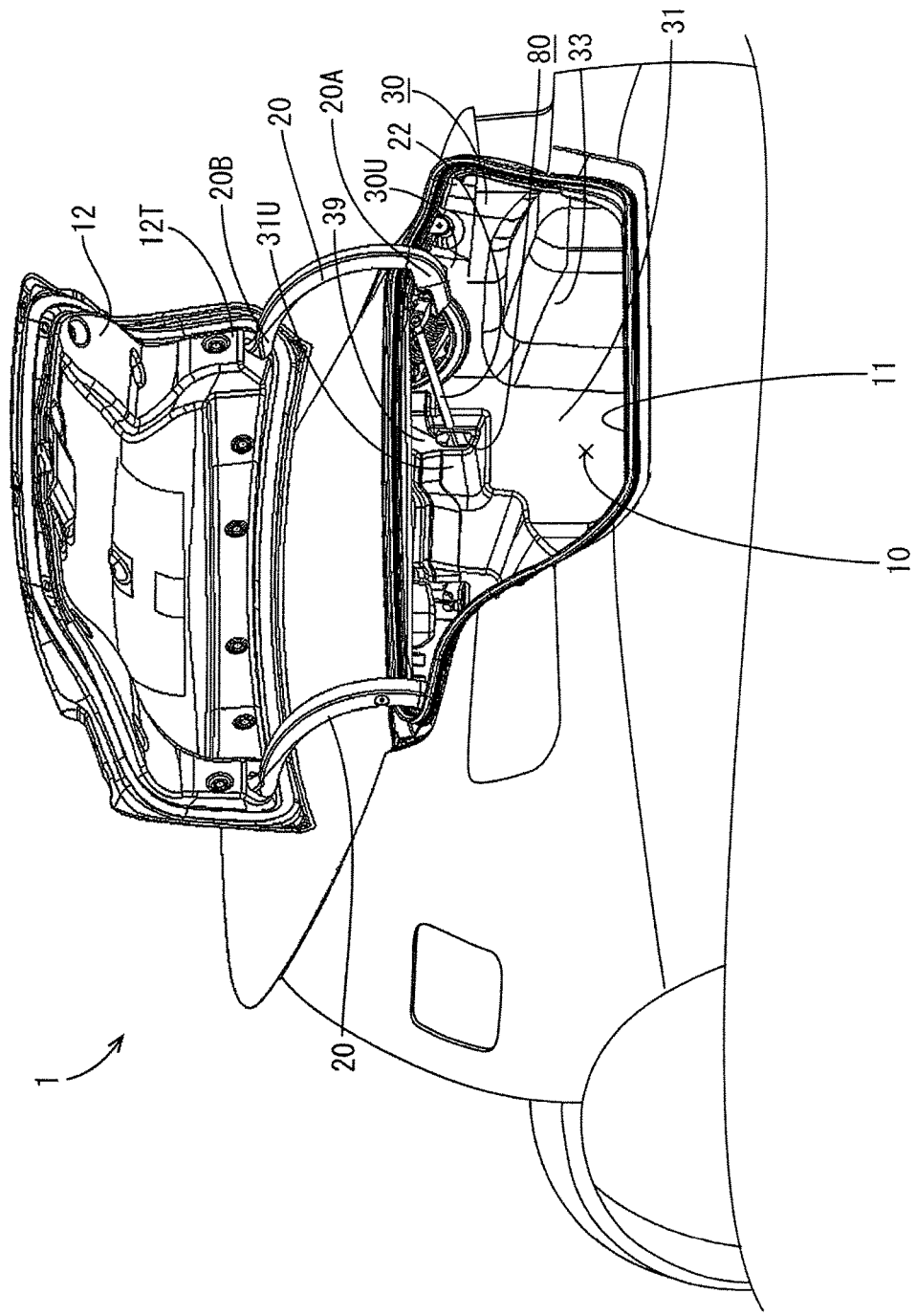
FIG. 3 is a perspective view illustrating the luggage room in FIG. 1 seen from further left side from FIG. 2.

As illustrated in FIGS. 1 and 3, the luggage door 12 is supported by a pair of U-arms 20 at one edge portion 12T thereof. Each of the U-arms 20 has substantially a U-shape and has a first connection portion 20A that is connected to a dumper 22 (only one of them on a right side in a vehicular running direction is illustrated). The dumpers 22 have a bar shape and extend in a vehicular front-rear direction. The U-arm 20 has a second connection portion 20B that is connected to the one edge portion 12T of the luggage door 12. The U-arms 20 are rotated and moved in the vehicular front-rear direction and a vertical direction such that the luggage door 12 is opened and closed. The opening and closing of the luggage door 12 is adjusted by the dumpers 22 and the dumpers 22 are moved vehicular up-down direction according to the opening and closing of the luggage door 12.

Figure 2:
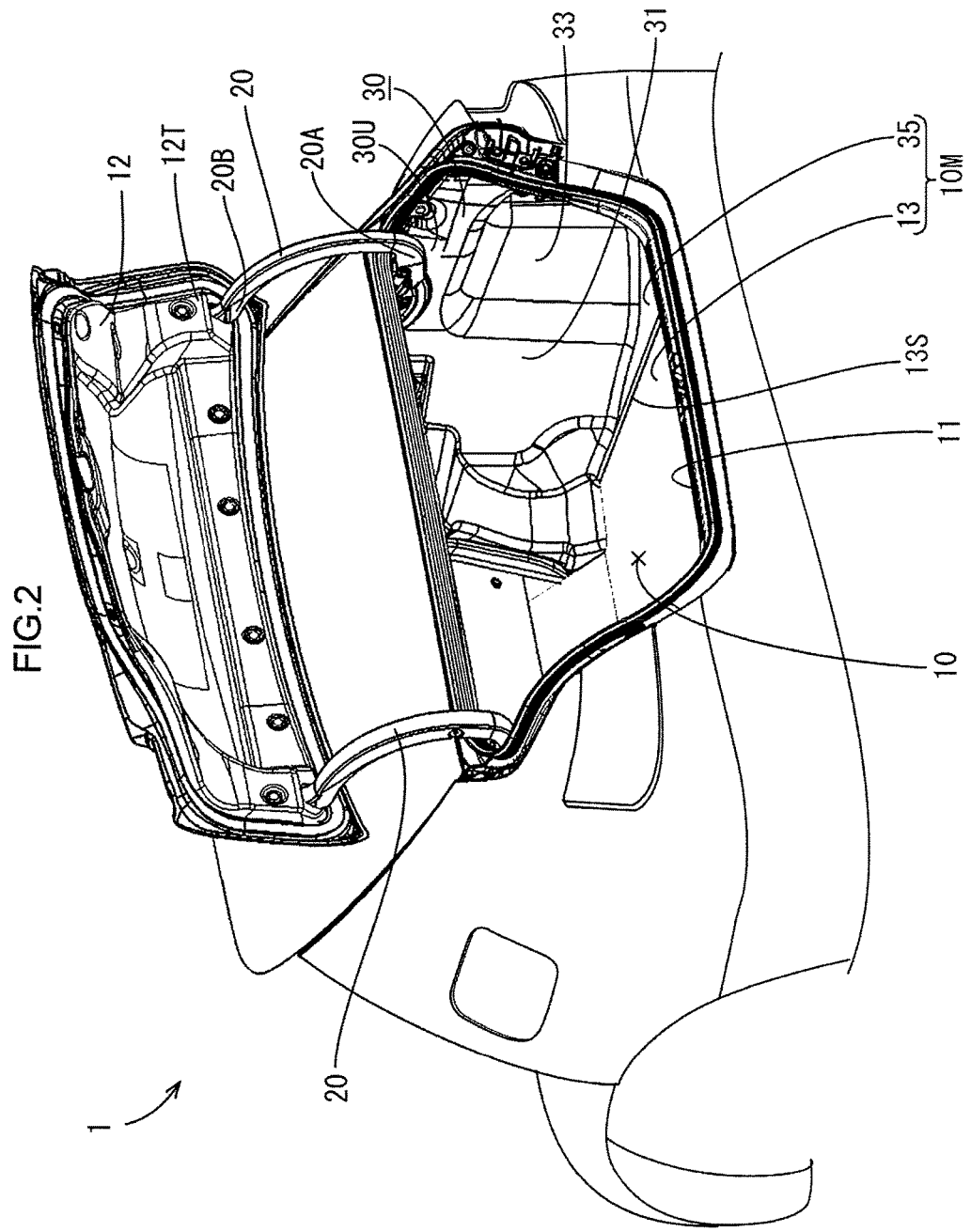
FIG. 2 is a perspective view illustrating the luggage room in FIG. 1 seen from further left side from FIG. 1.

As illustrated in FIG. 2, a luggage mat 13 is arranged within the luggage room 10 and forms a floor surface 10M of the luggage room 10. The luggage mat 13 is a plate member that horizontally extends. The luggage mat 13 has two side edges 13S with respect to a vehicular width direction (only one side edge 13S on the right side in the vehicular running direction is illustrated in FIG. 2), and the side edges 13S linearly extend in the vehicular front-rear direction.

The vehicle 1 includes a pair of luggage side trims 30 as both side walls of the luggage room 10 with respect to the vehicular width direction. Only one of the luggage side trims 30 on the right side in the vehicular running direction is illustrated in the drawings. Hereinafter, the side wall of the luggage room 10 on the right side will be described and the side wall on the left side will not be described.

The luggage side trim 30 extends in the vertical direction and the vehicular front-rear direction and includes a body portion 30B that is a substantially plate member and a bottom portion 35, and the luggage side trim 30 is mounted on a vehicular panel 2. As illustrated in FIGS. 2 to 5 and 7, the body portion 30B of the luggage side trim 30 includes a plate portion 31 and a recessed portion 33. The plate portion 31 is substantially a plate member formed along the vehicular panel of a wheel house portion. The recessed portion 33 is on a vehicular rear side with respect to the plate portion 31 and recessed toward the vehicular exterior side. The recessed portion 33 is formed not to be opposite the wheel house. As illustrated in FIGS. 2 and 5, the bottom portion 35 horizontally extends from the body portion 30B toward the vehicular interior side and forms a bottom portion of the recessed portion 33.

When the luggage side trim 30 is mounted on the vehicular panel 2, the bottom portion 35 is on a same plane as the luggage mat 13. Therefore, the bottom portion 35 forms a part of the floor surface 10M of the luggage room 10 and objects such as luggage are placed on the floor surface 10M formed with the luggage mat 13 and the bottom portion 35.

The luggage side trim 30 has an upper edge portion 30U that is on the vehicular exterior side with respect to the U-arm 20 and the damper 22 when the luggage door 12 is open. The upper edge portion 30U overlaps the damper 22 and the first connection portion 20A of the U-arm 20 in the open state of the luggage door 12. The upper edge portion 30U is disposed between the vehicular panel 2 and each of the U-arm 20 and the damper 22 and an upper edge of the upper edge portion 30U is above the damper 22 when the luggage door 12 is open. Thus, the luggage side trim 30 is mounted on the vehicular panel 2 to cover an entire area of the vehicular panel 2 inside the luggage room 10 and opposite the luggage side trim 30, as illustrated in FIGS. 2 and 3.

The upper edge portion 30U of the luggage side trim 30 includes an upper edge portion 31U of the plate portion 31. As illustrated in FIG. 6, the plate portion 31 includes a projection portion 32 at the upper edge portion 31U and the projection portion 32 projects toward the luggage room 10 (the vehicular interior side) and extends in the front-rear direction. The projection portion 32 has a damper arrangement portion 39S at a rear surface side (on the vehicular exterior side) thereof and is open along the vehicular front-rear direction and toward the vehicular exterior side to receive the damper 22. As illustrated in FIGS. 3, 4 and 9, the damper 22 is arranged in the damper arrangement portion 39S.

The upper edge portion 31U includes a wall portion 39 at the projection portion 32 and on the vehicular rear side. The wall portion 39 extends from a vehicular exterior surface of the upper end portion 31U. The wall portion 39 extends in the vehicular width direction and the up-down direction and faces a vehicular rear side. The wall portion 39 includes an insertion hole 80 therethrough in the vehicular front-rear direction. The insertion hole 80 is an elongated hole elongated in the up-down direction. A front portion 22F of the damper 22 can be in the damper arrangement portion 39S through the insertion hole 80. The insertion hole 80 is elongated in the up-down direction such that the damper 22 through the insertion hole 80 is movable in the up-down direction.

As illustrated in FIGS. 6, 8 and 9, the wall portion 39 includes a slit 90 on an upper and vehicular exterior side thereof. The slit 90 is communicated with the insertion hole 80 and extends straight from a hole edge upper portion 81 of the insertion hole 80 toward an upper side and the vehicular (luggage room) exterior side with respect to the vehicular width direction. The slit 90 is through the wall portion 39 similar to the insertion hole 80 and is open at an end opposite from the insertion hole 80 and has a damper insertion opening 91 at the end. The damper 22 is inserted through the damper insertion opening 91 and relatively moved along the slit 90 into the insertion hole 80. Thus, the damper 22 is arranged in the damper arrangement portion 39S.

When the luggage door 12 is lifted up to be opened, the U-arms 20 are moved toward the vehicular rear side and upward while being rotated such that the one end portion 12T of the luggage door 12 is moved upward. When the luggage door 12 is in an open state, as illustrated in FIG. 3, the U-arms 20 are exposed outside the luggage room 10. In the open state, the front portion 22F of each of the dampers 22 is in a middle portion within the insertion hole 80 with respect to the up-down direction, as illustrated in FIG. 9.

When the luggage door 12 is closed, as illustrated in FIG. 4, the U-arms 20 are moved down and toward the vehicular front side while being rotated. When the luggage door 12 is in a closed state, the U-arms 20 are arranged within the luggage room 10 and each of the dampers 22 is in an upper area within the insertion hole 80 and near the hole edge upper portion 81 within the insertion hole 80.

Next, a method of mounting the luggage side trim 30 will be described with reference to FIGS. 5 to 9. When the luggage side trim 30 is mounted on the vehicular panel 2, the luggage door 12 is opened as illustrated in FIG. 5. First, in the open state of the luggage door 12, as illustrated in FIG. 5, the luggage side trim 30 is inserted through the vehicular rear side opening 11 while being inclined such that the bottom portion 35 is almost vertical and faces the vehicular rear side.

Figure 7:
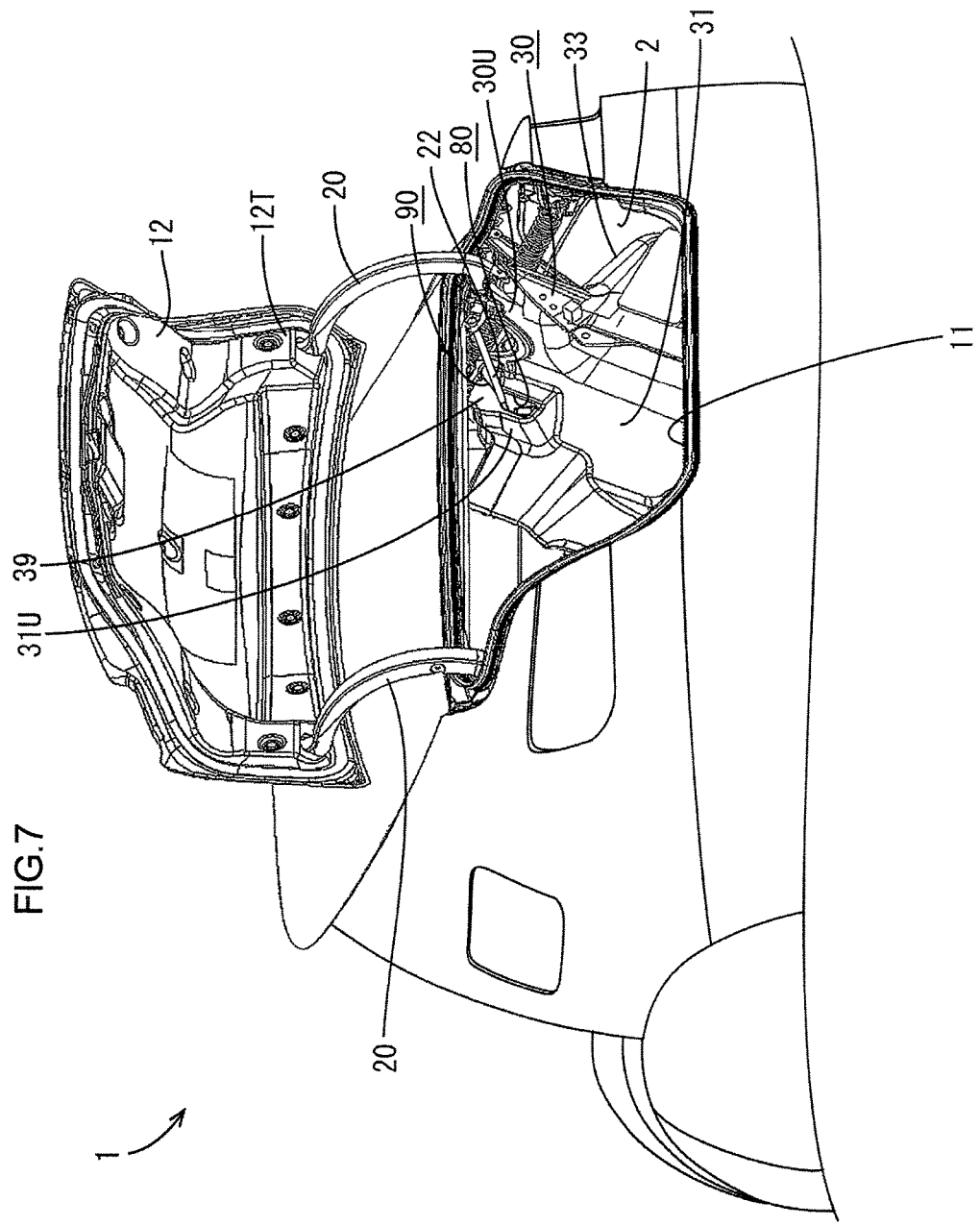
FIG. 7 is a perspective view illustrating a luggage room during a mounting process of mounting the luggage side trim.

Then, as illustrated in FIG. 7, the upper edge portion 30U of the luggage side trim 30 (including the upper edge portion 31U of the plate portion 31) is inserted in a space between the vehicular panel 2 and each of the U-arm 20 and the damper 22 from a lower side, and the damper 22 is inserted in the slit 90 through the damper insertion opening 91, as illustrated in FIG. 6. The luggage side trim 30 is further moved such that the upper edge portion 30U is moved further upward and toward the vehicular exterior side and the damper 20 is guided along the slit 90 into the insertion through hole 80, as illustrated in FIGS. 8 and 9. Then, the damper 22 is arranged in the damper arrangement portion 39S.

The whole luggage side trim 30 is moved along the slit 90 and rotated around the damper 22 toward the vehicular panel 2 (the vehicular exterior side) such that the bottom portion 35 is in a horizontal state. Thus, the luggage side trim 30 is mounted on the vehicular panel 2 and in a normal position as illustrated in FIGS. 3 and 7.

When the luggage side trim 30 is mounted on the vehicular panel 2, the slit 90 of the luggage side trim 30 is fit to the damper 22 that extends in the vehicular front-rear direction and that is within the luggage room 10 and on an inner side with respect to the vehicular panel 2 while the luggage side trim 30 being moved and rotated. Therefore, the damper 22 is less likely to be in hit on the luggage side trim 30 when the luggage side trim 30 is mounted on the vehicular panel 2. The luggage side trim 30 can be mounted on the vehicular panel 2 easily and smoothly.

Operations and Effects of the present embodiment will be described. In this embodiment, the luggage side trim 30 has the insertion hole 80 and the slit 90 that extends upward and toward the vehicular exterior side from the hole edge upper portion 81 of the insertion hole 80, and the damper 22 can be inserted through the damper insertion opening 91 to the slit 90 and moved along the slit 90 to the insertion hole 80 and the damper arrangement portion 39S. In the mounting structure of mounting such a luggage side trim 30 on the vehicular panel 2, the luggage side trim 30 can be mounted on the vehicular panel 2 without being obstructed by the damper 22.

More specifically, when the luggage side trim 30 having the above-described slit 90 is mounted on the vehicular panel 2, the upper edge portion 30U of the luggage side trim 30 is inserted in the space between the vehicular panel 2 and each of the U-arm 29 and the damper 22 from a lower side. The slit 90 receives the damper 22 through the damper insertion opening 91. Then, the luggage side trim 30 is further moved and rotated toward the vehicular exterior side such that the upper edge portion 30U is moved upward and toward the vehicular exterior side until the damper 22 is fit in the insertion hole 80. When the damper 22 is fit in the insertion hole 80, the luggage side trim 30 is arranged in the normal position.

With such a structure and a mounting structure of the luggage side trim 30, the upper edge portion 30U of the luggage side trim 30 is not necessary to be cut to avoid the obstruction by the U-arm or the damper. Therefore, the luggage side trim 30 can keep a large area to cover the whole vehicular panel 2 opposite the side wall of the luggage room 10. The luggage side trim 30 can cover a part of the vehicular panel 2 overlapping the damper 22 and the U-arm 20. This also improves noise insulation properties and vibration absorbing properties.

With such a structure of the luggage side trim 30 and a mounting structure of mounting the luggage side trim 30, the upper edge portion 30U of the luggage side trim 30 is on the vehicular exterior side with respect to the U-arm 20 and the damper 22 and the upper edge portion 30U overlaps the damper 22 and a part of the U-arm 20 that is within the luggage room 10. The upper edge of the upper edge portion 30U is above the damper 22 in the open state of the luggage door 12. Therefore, an object such as luggage is less likely to drop in the space between the luggage side trim 30 and the vehicular panel 2.

A luggage side trim that is formed of a single flat plate is easily moved obliquely upward and toward a luggage room exterior side after being inserted from a lower side with respect to the damper and the U-arm. However, the luggage side trim 30 according to this embodiment includes the recessed portion 33 recessed toward the vehicular exterior side and the bottom portion 35 forming a part of the floor surface 10M of the luggage room 10, and the bottom portion 35 may hit on the floor surface 10M of the luggage room 10 when the luggage side trim 30 is mounted on the vehicular panel 2. The luggage side trim 30 of this embodiment includes the slit 90 that receives the damper 22 therein and the whole luggage side trim 30 is less likely to be lowered on the floor surface 10M. Therefore, the luggage side trim 30 is mounted on the vehicular panel 2 without hitting on the floor surface 10M of the luggage room 10.

Other Embodiments

The present technology is not limited to the embodiment as described above with reference to the drawings. For example, the present technology may include following embodiments.

In the above embodiment, the insertion through hole 80 is a vertically elongated hole. However, the insertion through hole may be in any shape as long as the damper 22 can move vertically therein. The slit 90 linearly extends in the wall portion 39 in the above embodiment. However, the slit 90 may have any shape as long as the damper 22 can move through the slit to the insertion through hole 80.

The invention claimed is:

1. A luggage side trim that is to be a part of a side wall of a luggage room and to be mounted on a vehicular panel, the luggage side trim comprising:
    a body portion having a vehicular exterior surface facing the vehicular panel and an upper edge portion extending in a vehicular front-rear direction;
    a wall portion extending in a vehicular width direction from a part of the upper edge portion,
       the wall portion having an insertion hole through which a damper is to be inserted, the damper extending in a vehicular front-rear direction and being connected to a U-arm that is connected to a vehicular luggage door closing the luggage room, and
       the wall portion further having a slit that is communicated with the insertion hole and extends upward and toward a vehicular exterior side from the insertion hole and has a damper insertion opening being open toward the vehicular exterior side, the damper insertion opening receiving the damper that is to be guided along the slit toward the insertion hole when the luggage side trim is mounted on the vehicular panel, wherein when the luggage side trim is mounted on the vehicular panel, an upper edge of the upper edge portion is above the damper.

2. The luggage side trim according to claim 1, further comprising a bottom portion that extends perpendicularly from the body portion and forms a part of a floor surface of the luggage room, wherein the body portion includes a recessed portion recessed toward the vehicular exterior side.

3. The luggage side trim according to claim 1, wherein when the luggage side trim is mounted on the vehicular panel, the upper edge portion overlaps the damper that is through the insertion hole and a part of the U-arm that is within the luggage room when the luggage door is open, and the upper edge portion is on the vehicular exterior side with respect to the damper and the part of the U-arm.

4. The luggage side trim according to claim 1, wherein the insertion hole is vertically elongated.

5. The luggage side trim according to claim 1, wherein the upper edge portion has a projection portion projecting toward a vehicular interior side and extending in the vehicular front-rear direction, the projection portion includes the wall portion at a vehicular rear end thereof, and the projection portion has a damper arrangement portion in which the damper that is through the insertion hole is arranged when the luggage side trim is mounted on the vehicular panel, and the damper arrangement portion has an opening that is open toward the vehicular exterior side and through which the damper is inserted.

6. A mounting structure of mounting the luggage side trim according to claim 1 on the vehicular panel within the luggage room, wherein the upper edge portion of the body portion is inserted in a space between the vehicular panel and each of the U-arm and the damper from a lower side such that the damper insertion opening receives the damper and the damper is guided along the slit to the insertion hole, and when the luggage side trim is mounted on the vehicular panel, an upper edge of the upper edge portion is above the damper in an open state that the luggage door is open.

7. The mounting structure according to claim 6, wherein the luggage side trim further includes a bottom portion that extends perpendicularly from the body portion and forms a part of a floor surface of the luggage room, the slit receives the damper through the damper insertion opening and the damper is fit in the insertion hole while the luggage side trim being moved upward and toward the vehicular exterior side, and the bottom portion is horizontally arranged and on a same plane as a floor surface when the luggage side trim is mounted on the vehicular panel.

8. The mounting structure according to claim 6, wherein the luggage side trim further includes a bottom portion that extends perpendicularly from the body portion and forms a part of a floor surface of the luggage room, and the body portion includes a recessed portion recessed toward the vehicular exterior side.

9. The mounting structure according to claim 6, wherein when the luggage side trim is mounted on the vehicular panel, the upper edge portion overlaps the damper that is through the insertion hole and a part of the U-arm that is within the luggage room when the luggage door is open, and the upper edge portion is on the vehicular exterior side with respect to the damper and the part of the U-arm.

10. The mounting structure according to claim 6, wherein the insertion hole is vertically elongated such that the damper is movable.

11. The mounting structure according to claim 6, wherein the upper edge portion has a projection portion projecting toward a vehicular interior side and extending in the vehicular front-rear direction, the projection portion includes the wall portion at a vehicular rear end thereof, and the projection portion has a damper arrangement portion in which the damper that is through the insertion hole is arranged when the luggage side trim is mounted on the vehicular panel, and the damper arrangement portion has an opening that is open toward the vehicular exterior side and through which the damper is inserted.

* * * * *